US010505366B2

(12) United States Patent
Oresti

(10) Patent No.: US 10,505,366 B2
(45) Date of Patent: Dec. 10, 2019

(54) SYSTEM AND METHOD FOR MANAGING POWER GENERATION

(71) Applicant: G.A. POWER SOLUTIONS INC., Oakville (CA)

(72) Inventor: Joseph Oresti, Oakville (CA)

(73) Assignee: G.A. POWER SOLUTIONS INC., Oakville (CA)

( * ) Notice: Subject to any disclaimer, the term of this patent is extended or adjusted under 35 U.S.C. 154(b) by 0 days.

(21) Appl. No.: 16/066,362

(22) PCT Filed: Feb. 27, 2018

(86) PCT No.: PCT/CA2018/050225
§ 371 (c)(1),
(2) Date: Jun. 27, 2018

(87) PCT Pub. No.: WO2018/152650
PCT Pub. Date: Aug. 30, 2018

(65) Prior Publication Data
US 2019/0252877 A1  Aug. 15, 2019

Related U.S. Application Data

(60) Provisional application No. 62/463,945, filed on Feb. 27, 2017.

(51) Int. Cl.
*H02J 1/14* (2006.01)
*H02P 27/06* (2006.01)
(Continued)

(52) U.S. Cl.
CPC ............. *H02J 1/14* (2013.01); *H02J 3/32* (2013.01); *H02J 7/34* (2013.01); *H02P 27/06* (2013.01)

(58) Field of Classification Search
CPC ........................................................ H01J 1/14
See application file for complete search history.

(56) References Cited

U.S. PATENT DOCUMENTS 7,952,231 B1* 5/2011 Zansky ..................... H02J 7/34
307/44
2004/0245783 A1* 12/2004 Gilbreth ................... H02J 1/10
290/52

(Continued)

OTHER PUBLICATIONS

International Search Report and Written Opinion of corresponding PCT Application No. PCT/CA2018/050225.

*Primary Examiner* — Fritz M Fleming
(74) *Attorney, Agent, or Firm* — Bereskin & Parr LLP/S.E.N.C.R.L., s.r.l.

(57) ABSTRACT

Various embodiments are described herein for methods, devices and systems for providing power supply to an electrical load within a facility, which is connected to a power network to perform load displacement. The power management system includes a controller coupled to an electrical panel for controlling the operation of the electrical load, the controller being configured to determine a target power amount to be provided to the electrical load based on peak power amount required by the electrical load. The system includes a power regulator for generating at least one control signal based on the target power amount, and the power generation system for receiving the at least one control signal, generating target electrical power corresponding to the target power amount and transmitting the target electrical power to the electrical panel via a DC voltage power bus.

20 Claims, 8 Drawing Sheets

(51) Int. Cl.
*H02J 3/32* (2006.01)
*H02J 7/34* (2006.01)

(56) References Cited

U.S. PATENT DOCUMENTS

| | | | |
|---|---|---|---|
| 2007/0005192 A1 | 1/2007 | Schoettle et al. | |
| 2007/0005195 A1* | 1/2007 | Pasquale | H02J 3/00 700/295 |
| 2009/0271642 A1 | 10/2009 | Cheng et al. | |
| 2010/0066165 A1* | 3/2010 | Ganev | H02J 3/38 307/9.1 |
| 2011/0140648 A1 | 6/2011 | Lee | |
| 2011/0202193 A1 | 8/2011 | Craig et al. | |
| 2014/0012426 A1* | 1/2014 | Funakubo | H02J 3/32 700/286 |
| 2014/0103855 A1* | 4/2014 | Wolter | H02J 7/35 320/101 |
| 2014/0354047 A1* | 12/2014 | Markhovsky | H02J 7/0068 307/23 |

\* cited by examiner

SYSTEM AND METHOD FOR MANAGING POWER GENERATION

FIELD

The described embodiments relate to systems and methods for managing power generation, and in particular, to systems and methods for managing power generation during peak demand conditions using onsite electrical power generating resources.

BACKGROUND

Electrical energy costs have been rising and this trend is likely to continue as the energy industry moves towards higher cost energy storage systems for renewable energy generation resources and electrical distribution companies need to make new investments to upgrade the existing aging distribution infrastructure.

Many companies and organizations have already taken actions for reducing energy consumption costs. For example, many companies and organizations implement energy conservation programs to reduce energy waste. Such projects are often supported by government incentives.

To further reduce electrical energy operating costs, some operating facilities have enrolled in curtailment programs where they receive some financial benefit to reduce their energy consumption during peak demand periods. In such cases, the manufacturing facilities must cut back on their production levels to reduce their energy consumption. Even though there is a financial incentive to participate in the curtailment programs, the net effect is that some of these companies may suffer a loss due to the reduction in operating efficiencies when they decrease the production rates.

In some cases, some facilities that are planning to expand their production capacity run into the problem that the local distribution company is not able to increase the electrical feeder capacity to the plant to manage the new peak load due to restriction in the local distribution system. The net result is that the conventional electrical utility energy supply resources are becoming more constrained, costly and complicated to manage.

SUMMARY

In a broad aspect, at least one embodiment described herein provides a power management system for providing power supply to an electrical load within a facility, the facility being connected to a power network, the power network being a grid network or an islanded network, the power management system comprises: a controller coupled to an electrical panel, the electrical panel configured to control the operation of the electrical load, the controller being configured to determine a target power amount to be provided to the electrical load based on peak power amount required by the electrical load; a power regulator coupled to the controller, the power regulator being configured to receive a target power control signal corresponding to the target power amount from the controller; and a power generation system coupled to the power regulator, the power generation system being configured to receive at least one control signal corresponding to operation of the power generation system from the power regulator, the power generation system being configured to generate target electrical power corresponding to the target power amount based on the at least one control signal, the power generation system further being configured to transmit the target electrical power to the electrical panel via a direct current (DC) voltage power bus.

In some embodiments, the target power amount is additionally determined based on primary power received by the electrical panel from the power network In some embodiments, the target power amount is a predetermined value.

In some embodiments, the target power amount is additionally determined based on power required by the electrical load during power interruption to the electrical panel from the power network.

In some embodiments, the electrical load is a variable speed load coupled to a variable frequency drive inverter.

In some embodiments, the electrical load is a device coupled to an uninterruptable power supply inverter.

In some embodiments, the target electrical power is provided to the DC voltage power bus at a connection point, where the target electrical power is connected in parallel to the primary power received by the electrical panel at the connection point.

In some embodiments, the power generation system comprises a prime mover coupled to a power generator, where the prime mover is configured to generate a target mechanical energy based on the at least one control signal, and the power generator is configured to convert the target mechanical energy to the target electrical power based on the at least one control signal.

In some embodiments, the fuel for the prime mover is provided from a source within the facility.

In some embodiments, the power generation system comprises a power generator configured to convert a renewable energy to the target electrical power based on the at least one control signal.

In some embodiments, the power generation system comprises a power generator configured to convert a stored electrical energy to the target electrical power based on the at least one control signal.

In some embodiments, the power generation system comprises a plurality of power generating resources, where each power generating resource is configured to generate respective secondary power, where the respective secondary power is connected in parallel at the connection point.

In some embodiments, the target electrical power is converted to a corresponding three phase AC power by a variable frequency drive inverter located within the electrical panel, where the corresponding three phase AC power is provided to the electrical load.

In some embodiments, the target electrical power is converted to a corresponding three phase AC power by an uninterruptable power supply inverter located within the electrical panel, where the corresponding three phase AC power is provided to the electrical load.

In one aspect, in at least one embodiment described herein, there is provided a method of operating a power management system for providing power supply to an electrical load within a facility, the facility being connected to a power network, the power network being a grid network or an islanded network, the method comprising: determining, by a controller, a target power amount to be provided to the electrical load based on peak power amount required by the electrical load; determining, by a power regulator, at least one control signal corresponding to operation of a power generation system based at least on the target power amount; generating, by the power generation system, target electrical power corresponding to the target power amount based on the at least one control signal; transmitting the target electrical power to an electrical panel configured to control the operation of the electrical load via a DC voltage power bus, the target electrical power being provided in parallel to primary power received by the electrical panel from the power network; converting a combined electrical power to a corresponding three phase AC electrical power, the combined electrical power being a combination of target electrical power and primary power; and operating the electrical load based on the corresponding three phase AC electrical power.

In some embodiments, the method further comprises determining the target power amount based on the primary power received by the electrical panel from the power network.

In some embodiments, the target power amount is a predetermined value.

In some embodiments, determining the target power amount based on the power required by the electrical load during power interruption to the electrical panel from the power network.

In some embodiments, the electrical load is a variable speed load coupled to a variable frequency drive inverter.

In some embodiments, the electrical load is a device coupled to an uninterruptable power supply inverter.

In some embodiments, the target electrical power is provided to the DC voltage power bus at a connection point, where the target electrical power is connected in parallel to the primary power received by the electrical panel at the connection point.

In some embodiments, the power generation system comprises a prime mover coupled to a power generator, where the prime mover is configured to generate a target mechanical energy based on the at least one control signal, and the power generator is configured to convert the target mechanical energy to the target electrical power based on the at least one control signal.

In some embodiments, the fuel for the prime mover is provided from a source within the facility.

In some embodiments, the power generation system comprises a power generator configured to convert a renewable energy to the target electrical power based on the at least one control signal.

In some embodiments, the power generation system comprises a power generator configured to convert a stored electrical energy to the target electrical power based on the at least one control signal.

In some embodiments, the power generation system comprises a plurality of power generating resources, where each power generating resource is configured to generate respective secondary power, and where the respective secondary power is connected in parallel at the connection point.

In some embodiments, the target electrical power is converted to a corresponding three phase AC power by a variable frequency drive inverter located within the electrical panel.

In some embodiments, the target electrical power is converted to a corresponding three phase AC power by an uninterruptable power supply inverter located within the electrical panel.

In one aspect, in at least one embodiment described herein, there is provided a method of operating a power management system for providing power supply to an electrical load within a facility, the facility being connected to a power network, the power network being a grid network or an islanded network, the method comprising: determining, by a controller, a target power amount to be provided to the electrical load based on peak power amount required by the electrical load; determining, by a power regulator, at least one control signal corresponding to operation of a power generation system based at least on the target power amount; generating, by the power generation system, target electrical power corresponding to the target power amount based on the at least one control signal; and transmitting the target electrical power to an electrical panel configured to control the operation of the electrical load via a DC voltage power bus, the target electrical power being provided in parallel to primary power received by the electrical panel from the power network.

In some embodiments, the method also comprises converting a combined electrical power to a corresponding three phase AC electrical power, the combined electrical power being a combination of target electrical power and primary power; and operating the electrical load based on the corresponding three phase AC electrical power.

In various embodiments, the method is further described as above or other methods in accordance with the teachings herein.

In another aspect, in at least one embodiment described herein, there is provided a computer-readable medium storing computer-executable instructions. The instructions cause a processor to perform a method of operating a power management system for providing power supply to an electrical load within a facility, the facility being connected to a power network, the power network being a grid network or an islanded network, the method comprising: determining a target power amount to be provided to the electrical load based on peak power amount required by the electrical load; determining at least one control signal corresponding to operation of a power generation system based at least on the target power amount; generating target electrical power corresponding to the target power amount based on the at least one control signal; and transmitting the target electrical power to an electrical panel configured to control the operation of the electrical load via a DC voltage power bus, the target electrical power being provided in parallel to primary power received by the electrical panel from the power network.

In some embodiments, the instructions cause the processor to perform the methods as described above or other methods in accordance with the teachings herein.

In a further aspect, in at least one embodiment described herein, there is provided a computer-readable medium storing computer-executable instructions. The instructions cause a processor to perform a method of operating a power management system for providing power supply to an electrical load within a facility, the facility being connected to a power network, the power network being a grid network or an islanded network, the method comprising: determining a target power amount to be provided to the electrical load based on peak power amount required by the electrical load; determining at least one control signal corresponding to operation of a power generation system based at least on the target power amount; generating target electrical power corresponding to the target power amount based on the at least one control signal; transmitting the target electrical power to an electrical panel configured to control the operation of the electrical load via a DC voltage power bus, the target electrical power being provided in parallel to primary power received by the electrical panel from the power network; converting a combined electrical power to a corresponding three phase AC electrical power, the combined electrical power being a combination of target electrical power and primary power; and operating the electrical load based on the corresponding three phase AC electrical power.

In some embodiments, the instructions cause the processor to perform the methods as described above or other methods in accordance with the teachings herein.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment and the figures will now be briefly described.

Figure 1A:
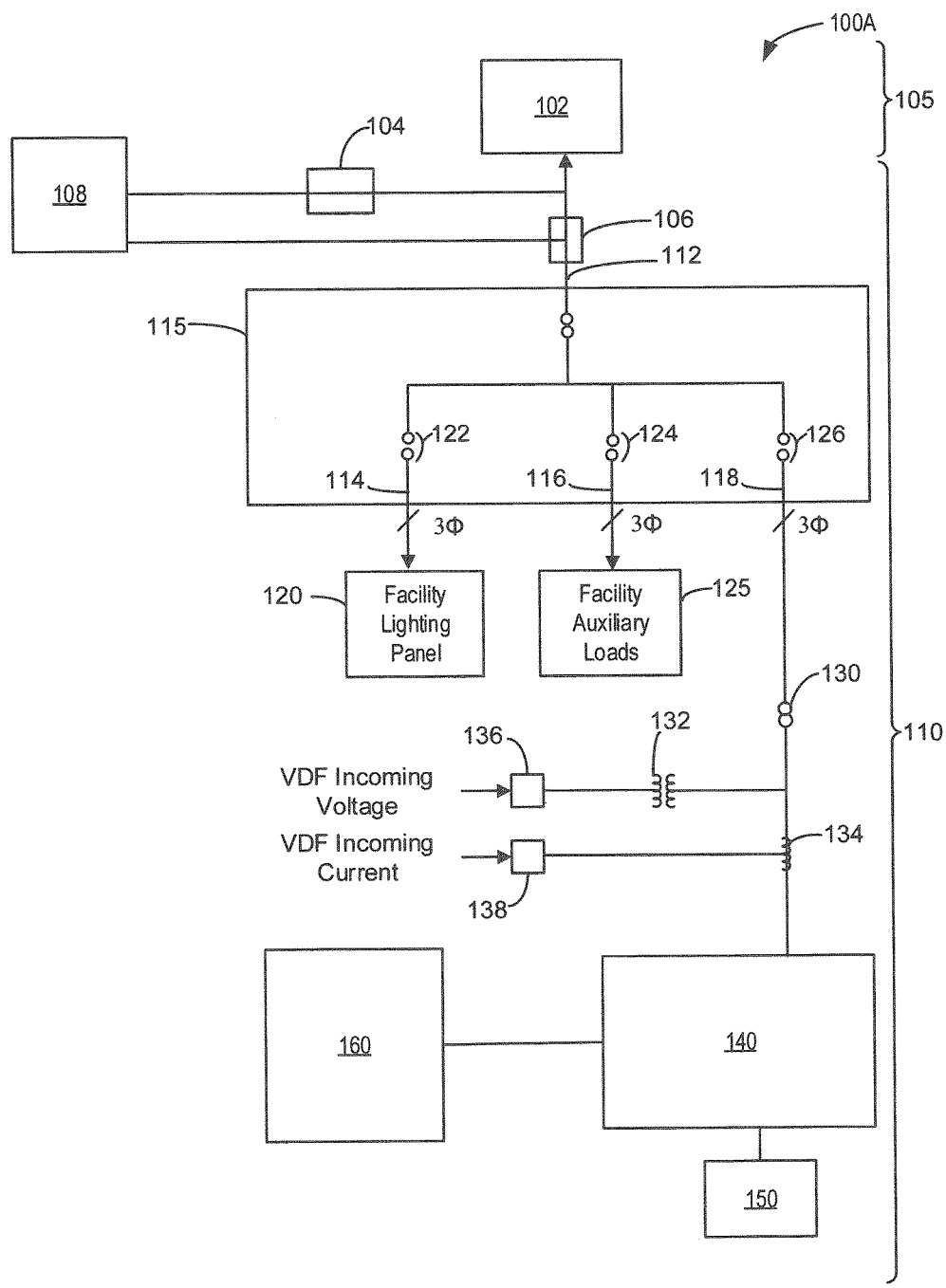
FIG. 1A is a block diagram of a power management platform according to an example.

The skilled person in the art will understand that the drawings, described below, are for illustration purposes only. The drawings are not intended to limit the scope of the applicants' teachings in anyway. Also, it will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF EXAMPLE EMBODIMENTS

Various apparatuses or processes will be described below to provide an example of at least one embodiment of the claimed subject matter. No embodiment described below limits any claimed subject matter and any claimed subject matter may cover processes, apparatuses, devices or systems that differ from those described below. The claimed subject matter is not limited to apparatuses, devices, systems or processes having all of the features of any one apparatus, device, system or process described below or to features common to multiple or all of the apparatuses, devices, systems or processes described below. It is possible that an apparatus, device, system or process described below is not an embodiment of any claimed subject matter. Any subject matter that is disclosed in an apparatus, device, system or process described below that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

It should also be noted that the terms "coupled" or "coupling" as used herein can have several different meanings depending in the context in which the term is used. For example, the term coupling can have a mechanical or electrical connotation. For example, as used herein, the terms "coupled" or "coupling" can indicate that two elements or devices can be directly connected to one another or connected to one another through one or more intermediate elements or devices via an electrical element, electrical signal or a mechanical element such as but not limited to, a wire or a cable, for example, depending on the particular context.

It should be noted that terms of degree such as "substantially", "about" and "approximately" as used herein mean a reasonable amount of deviation of the modified term such that the end result is not significantly changed. These terms of degree should be construed as including a deviation of the modified term if this deviation would not negate the meaning of the term it modifies.

Furthermore, the recitation of any numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation up to a certain amount of the number to which reference is being made if the end result is not significantly changed.

The various embodiments of the devices, systems and methods described herein may be implemented using a combination of hardware and software. These embodiments may be implemented in part using computer programs executing on programmable devices, each programmable device including at least one processor, an operating system, one or more data stores (including volatile memory or non-volatile memory or other data storage elements or a combination thereof), at least one communication interface and any other associated hardware and software that is necessary to implement the functionality of at least one of the embodiments described herein. For example, and without limitation, the computing device may be a server, a network appliance, an embedded device, a computer expansion module, a personal computer, a laptop, a personal data assistant, a cellular telephone, a smart-phone device, a tablet computer, a wireless device or any other computing device capable of being configured to carry out the methods described herein. The particular embodiment depends on the application of the computing device.

In some embodiments, the communication interface may be a network communication interface, a USB connection or another suitable connection as is known by those skilled in the art. In other embodiments, the communication interface may be a software communication interface, such as those for inter-process communication (IPC). In still other embodiments, there may be a combination of communication interfaces implemented as hardware, software, and a combination thereof.

In at least some of the embodiments described herein, program code may be applied to input data to perform at least some of the functions described herein and to generate output information. The output information may be applied to one or more output devices, for display or for further processing.

At least some of the embodiments described herein that use programs may be implemented in a high level procedural or object oriented programming and/or scripting language or both. Accordingly, the program code may be written in C, Java, SQL or any other suitable programming language and may comprise modules or classes, as is known to those skilled in object oriented programming. However, other programs may be implemented in assembly, machine language or firmware as needed. In either case, the language may be a compiled or interpreted language.

The computer programs may be stored on a storage media (e.g. a computer readable medium such as, but not limited to, ROM, magnetic disk, optical disc) or a device that is readable by a general or special purpose computing device. The program code, when read by the computing device, configures the computing device to operate in a new, specific and predefined manner in order to perform at least one of the methods described herein.

Furthermore, some of the programs associated with the system, processes and methods of the embodiments described herein are capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage. In alternative embodiments the medium may be transitory in nature such as, but not limited to, wire-line transmissions, satellite transmissions, internet transmissions (e.g. downloads), media, digital and analog signals, and the like. The computer useable instructions may also be in various formats, including compiled and non-compiled code.

The various embodiments disclosed herein relate to systems and methods for managing power generation and distribution during peak demand conditions using onsite electrical power generating resources. The occurrence of a peak demand condition is often associated with starting and running of large electrical loads, such as motor loads. Some examples of systems with significant motor load demand include: production equipment (e.g. equipment used in a sheet metal slitting line); compressor and pump equipment (e.g. compressors and pumps used in ice making equipment in a community center ice skating rink); operating pump equipment (e.g. equipment used in water purification plants that may be located in a remote community), and many others. There may be many other situations encountered where the operation of a specific piece of equipment of machine causes a facility to draw a considerable amount of power above the nominal power drawn from an electrical power or utility power supply system, whether may be a grid-connected arrangement or an autonomous arrangement (islanded or isolated). In some cases, operation of certain specific electrical loads causes the facility to draw peak amount of power from an electrical power supply system.

The various embodiments disclosed herein relate to systems and methods for managing power generation resources which can be connected in parallel, and in particular, to systems and methods for managing power generation resources during peak demand conditions using onsite electrical power generating resources to perform and manage a load displacement operation to reduce the loading of the utility power supply.

In various embodiments disclosed herein, power generation during peak demand conditions is managed by dedicating onsite power generating resources to specific loads. Dedicating onsite power generating resources to specific loads, such as variable frequency or variable speed loads or devices powered by uninterruptable power systems, may provide various advantages, such as simplified implementation, reduced operational costs, as well as elimination of load shedding or power imbalance in the system.

Managing and reducing the occurrence of peak demand conditions may additionally positively impact the operating facility in a number of ways. For example, reducing the occurrence of peak demand events may reduce peak demand charges that are imposed by an electrical utility provider on the facility. Likewise, reducing the occurrence of peak demand events may reduce the effect of energy curtailment programs on the manufacturing facilities that must cut back on production rates to reduce energy consumption in high demand periods. Managing and reducing the occurrence of peak demand events may also help in overcoming capacity limitations of local distribution systems and reducing energy consumptions costs as generating electrical power onsite may be less costly than purchasing electrical energy from the utilities. Furthermore, close coupling of the power loads control system to the onsite power generation control system may allow for easy implementation of a smart grid type control scheme that can command and operate the power generation equipment so as to match the specific demand requirements of the motor control system.

The various embodiments described herein facilitate a combination of onsite electrical power generation with primary power received from a power network, such as local or regional utility, in a cost-effective and efficient manner. The combination enables management of peak demand load conditions created by motor loads, thereby minimizing facility operating costs. The systems and methods disclosed in various embodiments herein can be used by grid connected facilities or by facilities with islanded power generation equipment.

The various embodiments disclosed herein generally relate to a system and a method for managing power generation during electrical peak demand events. More particularly, the various embodiments disclosed herein can be used for connecting one or more onsite generated electric power sources directly to a direct current (DC) voltage power bus (also referred to herein as 'DC power bus') of a variable frequency drive (VFD) or an uninterruptable power supply (UPS) system. With the connection to the DC power bus, the onsite generated power can be used as a supplemental power source to the primary electrical utility supplied power sources as the two power sources are connected in parallel to enable load sharing control. In various cases, the DC power bus consists of copper cables. The various embodiments disclosed herein may provide the advantages of reliable and low cost methods to reduce peak demand load conditions for the facility.

As discussed below, the load sharing function is controlled by a control apparatus, which includes a processor to ensure the onsite generated power is an amount proportional to the total motor load. The processor ensures that the total motor load is shared between the primary utility supply and the supplemental onsite generation system so as to achieve the lowest cost of operation for the facility electrical system.

In the various embodiments disclosed herein, since the motor load is fixed for a given operation, the control apparatus operates to reduce the power drawn from the utility system by increasing the power contributed by the onsite generated power source. In various cases, the reduction in power supplied by the utility primary power source via a rectifier to power the variable frequency or variable speed loads is reflected back to the facilities utility point of connection. This reduces the power demand on the electrical utility supplier. The control apparatus can be additionally applied to remove the motor peak demand loads measured by the utility, and therefore reduce and manage the associated demand charged applied by the utility company.

The control apparatus may be useful for organizations that operate electrical loads that contribute to the facility peak demand loads and are interested in reducing their peak demand costs that the electrical utility companies impose on them.

The control apparatus may also be useful for organizations that have a restriction on the amount of power they can draw from the utility feeder due to curtailment or restrictions in the local electrical distribution system. In such embodiments, the control apparatus may be operated to maintain power supply to the electrical loads in the event of a network power failure, thereby providing uninterrupted power operations to the facility loads.

In addition, the control apparatus may be useful to organizations operating an islanded micro grid and are interested to optimize their generating asset operation to the nominal system load and have dedicated generators that are operated for powering the electrical loads.

The electrical loads may be variable frequency or variable speed loads in some cases. In such cases, the electrical loads, such as motor loads, are connected to a variable frequency drive inverter, as discussed herein.

In some other cases, the electrical loads may be uninterruptable power supply devices that require uninterrupted power when in use. In such cases, the electrical loads may be connected to an uninterruptable power supply inverter, as discussed herein.

The various embodiments disclosed herein may provide the benefit of paralleling multiple onsite generated power sources, including generators, battery energy storage and renewable energy source to achieve cost savings benefits for operating facilities that operates VFD and/or UPS electrical loads. The various embodiments disclosed herein may generally provide tremendous value to facilities that are supplied electrical power from the national grid. Furthermore, the various embodiments disclosed herein may provide tremendous value to islanded power systems such as those commonly used on oil drilling rigs or in remote communities that operate diesel generators to power the local micro grid.

Reference is first made to FIG. 1A, which illustrates a block diagram of a power management platform 100A according to an example embodiment. Power management platform 100A is illustrated herein with reference to power distribution network 105 and a facility 110.

Power distribution network 105 includes power generation systems and power distribution systems. Power generation systems can include a network of electric power generators, such as hydro-electric, coal or nuclear power plants. The generated power is fed to power distribution systems comprising transformers, relays and circuit breakers to convert the generated power to higher voltages for transmission. Power distribution systems also include transmission lines to transmit power at high voltage in three-phase alternating current form to distribution subsystems, operated by utility operators, such as a local or regional power utility company. A typical distribution substation comprises a step-down transformer for lowering transmission voltage to suitable distribution voltages. A distribution subsystem also includes a plurality of feeder lines for distributing power from the step-down transformer to various consumers, including residential buildings such as houses, apartments, commercial buildings, institutions and industrial buildings etc. Feeder lines may be low voltage, medium voltage or high voltage feeder lines based on the amount of voltage that is being carried. In some cases, a medium or high voltage feeder lines may be used to supply power to a large industrial facility.

In the illustrated embodiment of FIG. 1A, distribution substation is providing a low voltage feeder to a facility 110 at a point of connection 102. Typically, in North America, the power supplied at the point of connection 102 is a 480 VAC, 3 phase, 60 Hertz power. In some other regions in North America, the power supplied at the point of connection 102 may be a 575 VAC, 3 phase, 60 Hertz power.

As illustrated in FIG. 1A, the three phase power delivered to the facility 110 is measured by a power meter module 108. The power meter module 108 may determine the power delivered to the facility 110, and accordingly provide signals containing billing information to the utility operator.

In the embodiment of FIG. 1A, the meter module 108 is coupled to a voltage transducer 104 and a current transducer 106 to respectively provide continuous measurements of voltage and current being delivered to the facility 110. Such measurements are used by the meter module 108 to calculate the total energy consumed by the facility 110 in a given billing period. Such measurements will reflect a higher consumption of current, and therefore power, when peak demand conditions are experienced at the facility 110.

A primary feeder line 112 is wired to an electrical distribution panel 115 within the facility 110. The electrical distribution panel 115 is a distribution electrical panel, which receives the three phase power from the point of connection 102 via the primary feeder line 112, and distributes it into branches for connecting to various loads within the premises of the facility 110. In the illustrated embodiment, the electrical distribution panel 115 provides three circuit breakers for three main load branches within the facility 110.

As shown, the first circuit breaker 122 within the electrical distribution panel 115 is connected between the primary feeder line 112 and a first secondary feeder line 114 providing three phase power to the lighting panel 120 within the facility 110. The second circuit breaker 124 within the electrical distribution panel 115 is connected between the primary feeder line 112 and a second secondary feeder line 116 providing three phase power to the auxiliary loads 125 within the facility 110. Likewise, a third circuit breaker 126 is connected between the primary feeder line 112 and a third secondary feeder line 118 providing three phase power to a variable frequency drive (VFD) isolation transformer 130. The first circuit breaker 122, the second circuit breaker 124 and the third circuit breaker 126 are used to protect each branch from damage caused by overload or short circuit.

The VFD isolation transformer 130 is configured to step down the primary voltage received on the secondary feeder line 118 to a secondary voltage that is required by the VFD panel 140 for its operation. In the illustrated embodiment, the VFD isolation transformer 130 steps down the incoming 480 VAC/3 phase primary voltage on the secondary feeder line 118 to 460 VAC/3 phase secondary voltage provided to the VFD panel 140. In the illustrated embodiment, the VFD panel 140 has a nominal voltage rating of 460 VAC/3 phase.

In the embodiment of FIG. 1A, the VFD panel 140 is an electrical panel configured to control the operation of an electrical load 150. In one example, the VFD panel 140 is an ice rink refrigeration control system, and the electrical load 150 is a variable speed motor or motors controlled by the VFD panel 140.

As shown in FIG. 1A, the secondary side of the VFD isolation transformer 130 is connected to a voltage transducer 132 and a current transducer 134 to respectively monitor the voltage and current consumed by the VFD panel 140. Voltage transmitter module 136 is configured to receive voltage measurements from the voltage transducer 132, convert the voltage measurements to a voltage control signal and transmit the voltage control signal to a power management system 160. Current transmitter module 138 is configured to receive current measurements from the current transducer 134, convert the current measurements to a current control signal and transmit the current control signal to the power management system 160.

The power management system 160 is provided onsite the facility 110. By onsite, it is meant that the power management system 160 is either within the premises of the facility 110, or within a very short distance from the facility 110, such that the power generated by the power management system 160 is connected to the facility downstream from the utility point of connection 102. In fact, the power generated by the power management system 160 is provided to the facility at the VFD panel 140 configured to control the operation of the electrical load 150. In other words, the power generated by the power management system 160 is connected to the facility at the load level.

Figure 1B:
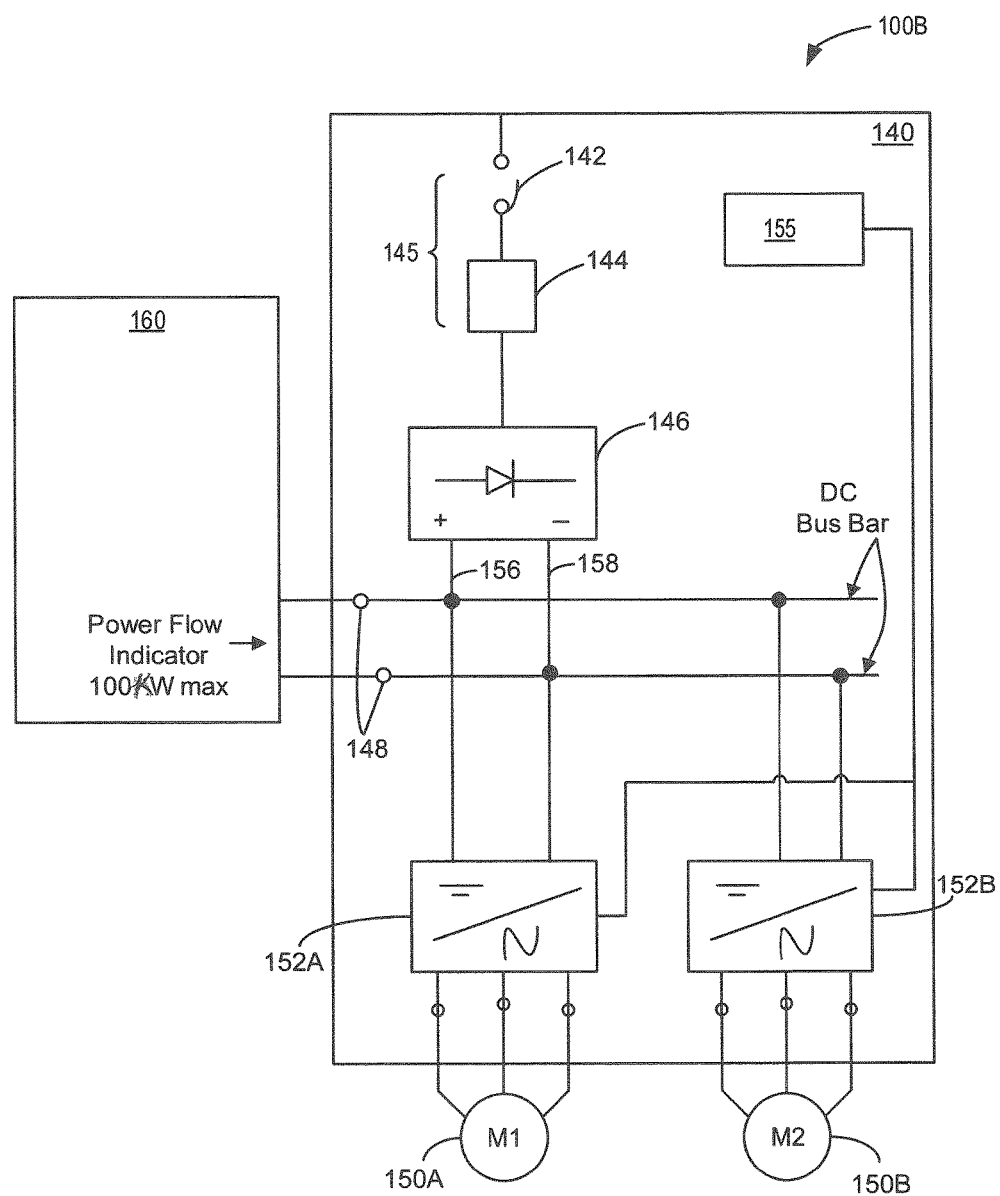
FIG. 1B is another example of a block diagram of a power management platform.

Reference is next made to FIG. 1B, which illustrates a block diagram of a power management platform 100B according to an example embodiment. Power management platform 100B is illustrated herein with reference to various components introduced in FIG. 1A, including the VFD panel 140, electrical load 150 and power management system 160.

As illustrated in FIG. 1B, the VFD panel 140 includes a disconnect system 145. In the illustrated embodiment, the disconnect system 145 includes a first device 142, which is a disconnect switch configured to disconnect the supply of electrical power to the VFD panel 140. The disconnect system 145 further includes a second device 144, which is an overload or short circuit protection device configured to protect the VFD panel 140 from overload conditions.

The disconnect system 145 is connected to a DC rectifier 146, which rectifies the three phase power received by the VFD panel 140 into a DC voltage. The DC voltage is delivered to electrical load 150 via a positive DC power bus 156 and a negative DC power bus 158. The DC rectifier 146 is sized to deliver the maximum power required for the operation of electrical load 150.

In the various embodiments disclosed herein, the DC voltage resulting from the DC rectifier 146 can vary depending on a variety of factors, such as supply voltage variations, motor loading and electrical equipment models and versions used in the design of the power management platform, etc. In most cases, the nominal DC voltage resulting from the DC rectifier 146 is directly related to the secondary voltage rating of the VFD isolation transformer 130. Some non-limiting DC examples include, such as, for example, a 340 VDC, 650 VDC, 812 VDC, etc.

In an example where the VFD panel 140 is assumed to be a part of an ice rink refrigeration control system, and where the electrical load 150 consists of a first compressor motor 150A and a second compressor motor 150B, the DC rectifier is configured to convert 460 VAC/3 phase incoming power to a nominal bus voltage of 650 VDC power.

As illustrated in FIG. 1B, the DC rectifier 146 is connected to a first VFD inverter 152A and a second VFD inverter 152B via the positive and negative DC power bus 156, 158. The first and the second VFD inverters 152A, 152B are configured to convert the received DC voltage back to a three phase AC voltage to provide power to an electrical load 150. In cases where the electrical load 150 is a single load, only one VFD inverter is connected between the rectifier 146 and the electrical load 150. However, as shown in the embodiment of FIG. 1B, since the electrical load 150 includes two compressor motors 150A, 150B, two VFD rectifiers 152A, 152B are provided, where each compressor motor 150A, 150B receives power from a unique VFD rectifier 152A, 152B.

The first and the second VFD inverters 152A, 152B are coupled to a programmable logic controller (PLC) 155 to control the operation of the inverters. For example, the first and the second VFD inverters 152A, 152B are configured to vary the output frequency and voltage generated by the inverters based on the operating instructions from the PLC 155.

The PLC 155 is configured to determine the operating variables of electrical loads. Some non-limiting examples of operating variables include start, stop and motor speed commands for the electrical loads. Such operating variables affect the voltage, frequency and electrical power required by the electrical load 150. Based on this information, PLC 155 instructs the first and second VFD inverters 152A, 152B to accordingly convert the incoming DC power to appropriate AC signals.

In an example where the VFD panel 140 is assumed to be a part of an ice rink refrigeration control system, and where the electrical load 150 consists of a first compressor motor 150A and a second compressor motor 150B, the incoming 650 VDC on the DC power bus 156, 158 is converted to two three phase AC voltages to respectively provide power to the first compressor motor 150A and the second compressor motor 150B, where the compressor motors may be of the same or different sizes.

In the various embodiments illustrated herein, the positive and negative DC power bus 156, 158 can connect to power supply from an external onsite power source at connection points 148. In particular, the positive and negative DC power bus 156, 158 can connect to external power supplied from the power management system 160, connecting the external power supply in parallel to the DC rectifier 146.

In the illustrated embodiment, the DC rectifier 146 may be considered to be the primary power source for servicing the electrical load 150 since the DC rectifier 146 is permanently connected to the distribution network. In normal operating conditions, the DC rectifier 146 is sized to provide the total power required by the electrical load 150.

The power management system 160 may be considered to be a secondary source of power for servicing the electrical load 150 since the power management system 160 is triggered on during peak load conditions. The power management system 160 is sized based on the application of the facility, and particularly the characteristics of the electrical load 150.

With the primary and the secondary power sources connected in parallel onto the same DC power bus 156, 158, the total power contributed by each of the primary and the secondary power source can be controlled by regulating the DC voltage output of the power management system 160 relative to the DC voltage output of the DC rectifier 146. For example, in situations where the electrical load 150 is fixed, increasing the power contribution from the power management system 160 will result in a reduction in the amount of power contributed by the DC rectifier 146. This will reduce the amount of power that is drawn from the power distribution network 105 (e.g. from utility operator), which will accordingly reduce the reading and billing determined by the meter module 108. On the other hand, reducing the power contribution by the power management system 160 will increase the amount of power required from the DC rectifier 146, which will accordingly increase the power drawn from the distribution network 105. This will increase the reading and billing determined by the meter module 108.

In the various embodiments disclosed herein, the power management system 160 can operate in an offline or online mode. In the online mode, the power management system 160 can be automatically triggered to turn on, or can be manually triggered to turn on. In the offline mode, the electrical load 150 is serviced entirely by the primary power received from the DC rectifier 146. On the other hand, in the online mode, the electrical load 150 is serviced by both the primary power received from the DC rectifier 146 and secondary power received from the power management system 160. The proportion of power received from the power management system 160 may be predetermined, manually provided, or dynamically determined by the power management system 160.

Figure 2:
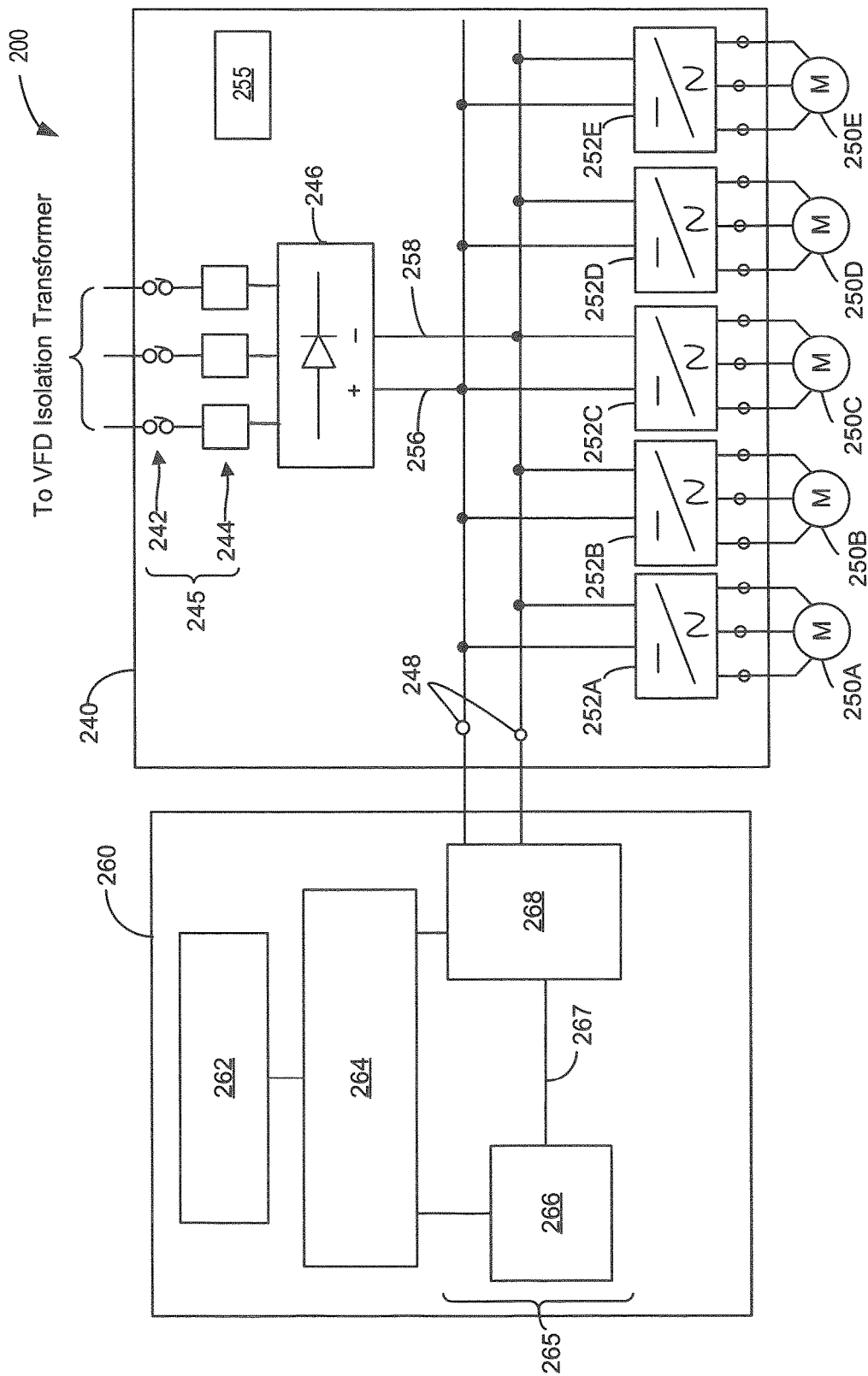
FIG. 2 is another example of a block diagram of a power management platform.

Reference is next made to FIG. 2, which illustrates a power management platform 200 according to another example. Power management platform 200 is illustrated with reference to the power management system 260 and VFD panel 240. Power management system 260 of FIG. 2 is analogous to power management system 160 of FIGS. 1A and 1B. VFD panel 240 of FIG. 2 is analogous to VFD panel 140 of FIGS. 1A and 1B.

In the illustrated embodiment of FIG. 2, the power management system 260 includes a master controller 262, a power regulator 264 and an onsite power generation system 265. Onsite power generation system 265 includes a prime mover 266, which is mechanically coupled 267 to DC power generator 268. The power management system 260 is connected to the positive and negative DC power bus 256, 258 at the output of the DC power generator 268.

Master controller 262 is configured to determine the amount of secondary power (referred to as "target secondary power" or "target power") to be supplied by the power management system 260 to the VFD panel 240, and accordingly the electrical loads. Once the target secondary power value is determined, the master controller 262 transmits this information via a control signal to power regulator 264. For example, the master controller 262 transmits a target power control signal corresponding to target secondary power to the power regulator 264.

In some cases, the master controller 262 is configured to receive input signals from a voltage transmitter module, analogous to the voltage transmitter module 136 of FIG. 1A, and a current transmitter module, analogous to the current transmitter module 138 of FIG. 1A. The master controller 262 processes the received input signals from the voltage transmitter module and the current transmitter module to determine the amount of power being provided to the electrical load 250 from the primary power source. Based on this information, the master controller 262 is configured to determine the amount of target secondary power to be generated by the secondary source. The target secondary power information is provided to the power regulator 264.

In some other cases, the target secondary power value may be predetermined and pre-stored in the master controller 262. In such cases, the predetermined target secondary power value is transmitted to the power regulator 264. In some further cases, the master controller 262 may be configured to receive a target secondary power value from an external third party, such as a facility operator or owner, etc.

In some cases, where the onsite power generation system 265 consists of a number of different types of energy generating resources, the master controller 262 is configured to determine the combination of the resources to be used at a given time to supply secondary power to the electrical load. Such a scenario with multiple energy generating resources is disclosed with reference to FIG. 7.

Power regulator 264 is configured to receive the target secondary power information from the master controller 262, and determine the control instructions (for example, in the form of control signals) to be transmitted to the onsite power generation system 265 for it to generate power to meet the target secondary power determined by the master controller. In the illustrated embodiment, power regulator 264 controls the operation of the prime mover 266 and the DC power generator 268, and modulates the DC voltage of the DC power generator 268 so that it is able control the a the amount of power that is contributed to the total power demanded by the electrical motors.

In various embodiments, the power regulator 264 is configured to take into consideration certain factors, such as, operational constraints of various components used within the onsite power generation system 265 to determine the duration, frequency and general operation of those components.

Referring back to FIG. 2, the prime mover 266 is a device that provides mechanical energy to power the operation of the DC power generator 268. The operation of prime mover 266 is controlled by the power regulator 264. DC power generator 268 may be any device configured to generate onsite DC power. Similar to power mover 266, the operation of the DC power generator 268 is controlled by the power regulator 264. The onsite power generated by the DC power generator 268 is connected to the positive and negative DC power bus 256, 258 of the VFD panel 240 at connection point 248.

As illustrated VFD panel 240 includes a disconnect system 245 analogous to disconnect system 145 of FIG. 1B. In the illustrated embodiment, the disconnect system 245 consists of a first device 242 analogous to the disconnect switch 142 of FIG. 1B, and a second device 244 analogous to the overload or short circuit protection device 144 of FIG. 1B. The disconnect system 245 is connected to a DC rectifier 246, analogous to DC rectifier 146 of FIG. 1B. The DC rectifier 246 is configured to rectify the three phase power received by the VFD panel 240 into DC voltage. The DC voltage is transmitted from the DC rectifier 246 via a positive DC power bus 256 and a negative DC power bus 258.

As illustrated, the DC voltage is transmitted from the DC rectifier 246 to a number of VFD inverters 252A-252E, which relays the power to corresponding electrical loads 250A-250E. In particular, the DC rectifier 246 is coupled to a first VFD inverter 252A, a second VFD inverter 252B, a third VFD inverter 252C, a fourth VFD inverter 252D and a fifth VFD inverter 252E. VFD inverters 252A-252E are configured to convert the received DC voltage to three phase AC voltage based on instructions from the PLC 255, analogous to PLC 155 of FIG. 1B.

In the illustrated embodiment, the first VFD inverter 252A is connected to a first electrical load 250A, the second VFD inverter 252A is connected to a second electrical load 250B, a third VFD inverter 252C is connected to a third electrical load 250C, a fourth VFD inverter 252D is connected to a fourth electrical load 250D and a fifth VFD inverter 252E is connected to a fifth electrical load 250E.

As discussed, the master controller 262 is configured to determine the amount of onsite power generation required by the DC power generator 268. The onsite secondary power generated by the DC power generator 268 is connected to the power generated by the primary DC rectifier 246 in parallel. The combined power is then provided to the DC inverters 252A-252E for converting to corresponding three phase AC power, which is provided to corresponding electrical loads 250A-250E.

In one example, the VFD panel 240 is assumed to be a part of a steel slitting system, and the electrical loads 250A-250C are machines used in the steel processing industry to slit flat steel coils into a number of narrow width steel coils. In this example, the first electrical load 250A is a uncoiler motor rated at 100 kW, the second electrical load 250B is a flattener motor rated at 200 kW, the third electrical load 250C is a first slitter knife motor rated at 200 kW, the fourth electrical load 250D is a second slitter knife motor rated at 200 kW and the fifth electrical load 250E is a recoiler motor rated at 200 kW.

In the illustrated example, the DC rectifier 246 is sized to meet the overall load demand of the steel slitting system, which may be determined to be, for example, as 750 kW. In some other cases, the overall load demand of the steel slitting system may be determined to be any other value that is less than, equal to, or more than the sum of the load demands of all the connected electrical loads 250A-250E.

In this example, the DC rectifier 246 may be sized to meet an overall load demand of 750 kW that is less than the sum of the load demands of all the connected electrical loads 250A-250E. This may be acceptable in this example since it is not possible to have all the electrical loads drawing a full load current at the same time. Furthermore, the first electrical load (the uncoiler motor) 250A and the corresponding first DC inverter 252A may be configured to regenerate energy to create the required strip tension for the process to work properly, accordingly allowing for DC rectifier 246 to be sized to meet an overall load demand that is less than the sum of the load demands of all connected electrical loads.

In the example of steel slitting system, the DC power generator 268 may be sized to provide a certain percentage of the maximum full load demand of the connected electrical loads 250A-250E. For example, the DC power generator 268 may be sized to provide up to a maximum of 200 kW (or 26% of the maximum full load demand of the connected electrical loads 250A-250E) of supplementary power to the DC power bus 256, 258 when the power management system 260 is engaged.

In the case of steel slitting system, the maximum motor loading occurs when the electrical loads 250A-250E process the hardest, thickness and widest strip steel at the most number of cuts. It is common that the slitting line runs a wide range of product thicknesses, widths, and number of cuts. Therefore the nominal motor loads of the slitting machine are dependent on the nominal product mix that the machine is scheduled to processes. Typically the nominal motor loads are much less than the maximum loads encountered for the most difficult product.

As discussed above, the electrical loads 250A-250E are supplied by power from both the primary power source from the DC rectifier 246 and secondary power source from the power management system 260, particularly from DC power generator 268, in peak demand conditions when the primary power is not enough to service the electrical loads 250A-250E.

In some other cases, other factors may cause the secondary power source to be introduced to service the electrical loads 250A-250E either alone, or in combination with primary power from DC rectifier 246. Such factors may include time of day (e.g. peak hours as defined by utility operators), cost saving reasons (e.g. to minimize utility costs), other business motivations, etc.

Figure 3:
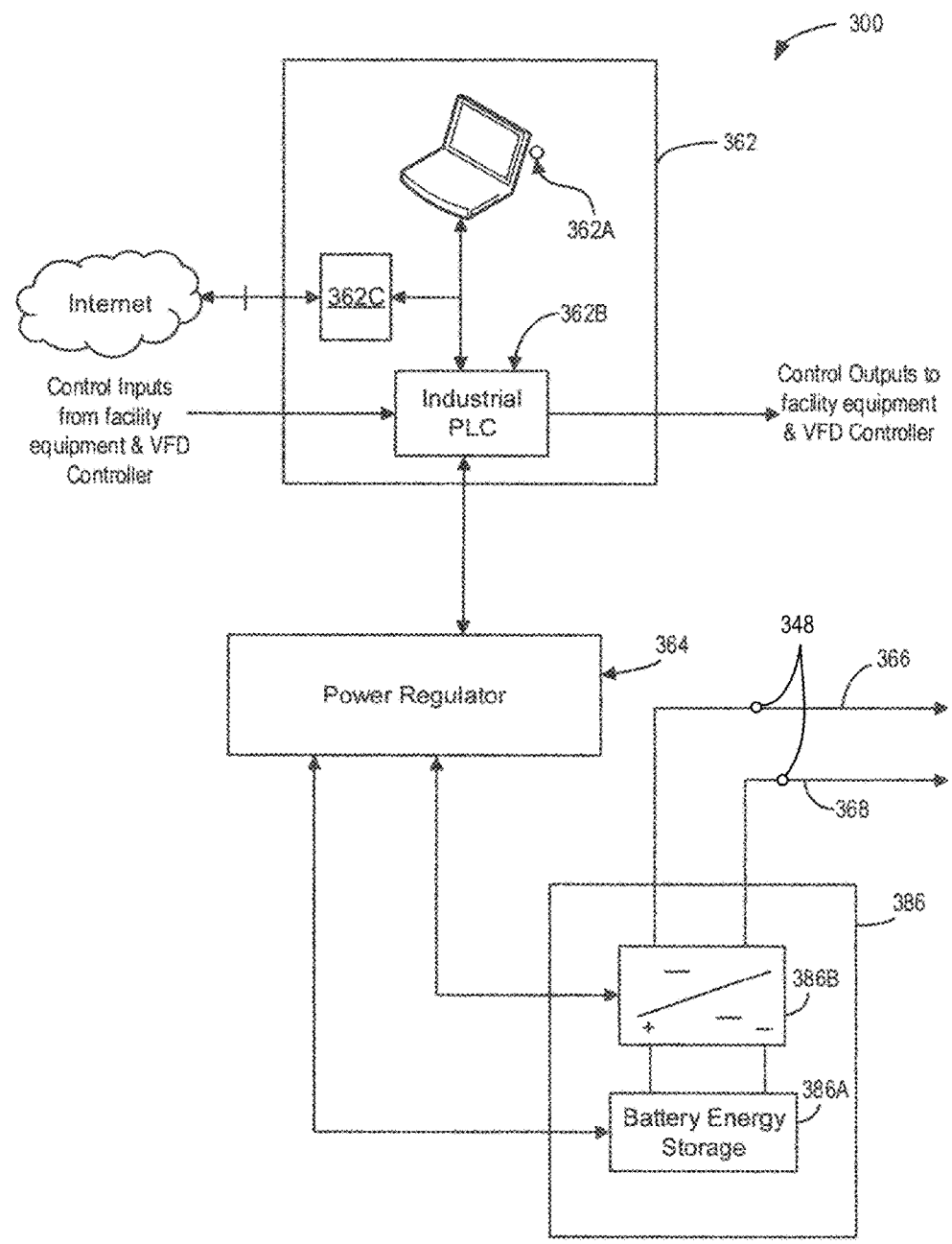
FIG. 3 is a block diagram of a power management system according to an example.

Reference is next made to FIG. 3, which illustrates a block diagram of a power management system 300 according to an example embodiment. Power management system 300 is analogous to power management system 200 of FIG. 2. The power management system 300 includes a master controller 362, which is analogous to master controller 262 of FIG. 2, a power regulator 364, which is analogous to power regulator 264 of FIG. 2 and a DC power generation system 386.

In the illustrated embodiment, the master controller 362 includes an operator interface unit 362A, an industrial PLC 362B and a router 362C. The operator interface unit 362A is configured to provide a number of functions for the operation of the power management system 300. For example, the operator interface unit 362A provides a user interface to an operator or technical personnel to set up operating parameters for the control of the various components of the power management system 300. In another example, the user interface of the operator interface unit 362A is used by an operator or technical personnel to command the power management system 300 to operate in manual or automatic operating modes. Similarly, the user interface of the operator interface unit 362A can also be used to output information on the current operations being performed by the various components of the power management system 300, and the amount of power being supplied by the system 300.

The operator interface unit 362A may also be configured to show information such as the performance of the power management system 300 in the current billing period. The operator interface unit 362A can also be used to set up alarms to monitor the performance of the various components of the system 300, and to trigger alarms when a predetermined event occurs. The operator interface unit 362A can be configured to show current and historical alarm events. The operator interface unit 362A can also be configured to record and save the overall performance of the system 300, and provide historical information, such as previous billing period operating data, upon request.

The master controller 362 also includes a PLC 362B, which is configured to store and execute algorithms to prove real time control of the various components of system 300. The PLC 362B may be configured to receive information from a number of sources including, operating set points of various components within system 300 and within the facility, such as facility 110 of FIG. 1A, real time measurements from various sensors and devices within the facility such as voltage transmitter module 136 and current transmitter module 138, status information from other PLC's in the facility, such as VFD panel 140 of FIG. 1B and VFD panel 240 of FIG. 2, etc. The PLC 362B receives and processes such various inputs and determines the control signals for the operation of the power regulator 364, and accordingly for the operation of the DC power generator 368.

As illustrated in FIG. 3, the master controller 362 also includes a router 362C which connects the master controller 362 to a wired or wireless network. The router 362C is configured to route the various inputs received by the PLC 362B, various outputs generated by the PLC 362B, various inputs and outputs of the operator interface unit 362A etc. to other systems or devices, such as facilities enterprise management system, or remote control devices such as smart phone applications etc.

In the illustrated embodiment of FIG. 3, the DC power generation system 386 includes a battery storage system 386A and a DC/DC converter 386B. In this embodiment, there is no need for a prime mover, such as a prime mover 266 of FIG. 2. The battery storage system 386A is configured to provide predetermined power for a predetermined duration of time. For example, the battery storage system 386A may be configured to provide 125 kW of power for 3 hours. The battery storage system 386A may be charged by a DC rectifier, such as the DC rectifier 146 of FIG. 1B and DC rectifier 246 of FIG. 2, within the facility.

The electrical power provided by the battery storage system 386A is provided to the DC/DC converter 386B. DC/DC converter 386B may be configured to step up, step down and/or filter the power received from the battery storage system 386A and generate output power, which is provided to the positive and negative DC power bus 366, 368 at connection point 348.

In the illustrated embodiment, the master controller 362 is configured to determine how much power is to be injected into the DC power bus 366, 368. The master controller 362 is also configured to determine at what times the power should be injected from the DC power generator 386 to the DC power bus 366, 368. In addition, the master controller 362 is also configured to determine the time, frequency and amount of recharge required by the battery energy storage 386A. Such information is relayed to the power regulator 364, which accordingly controls the operation of the DC power generator 386, including the battery storage system 386A and the DC/DC converter 386B.

Figure 4:
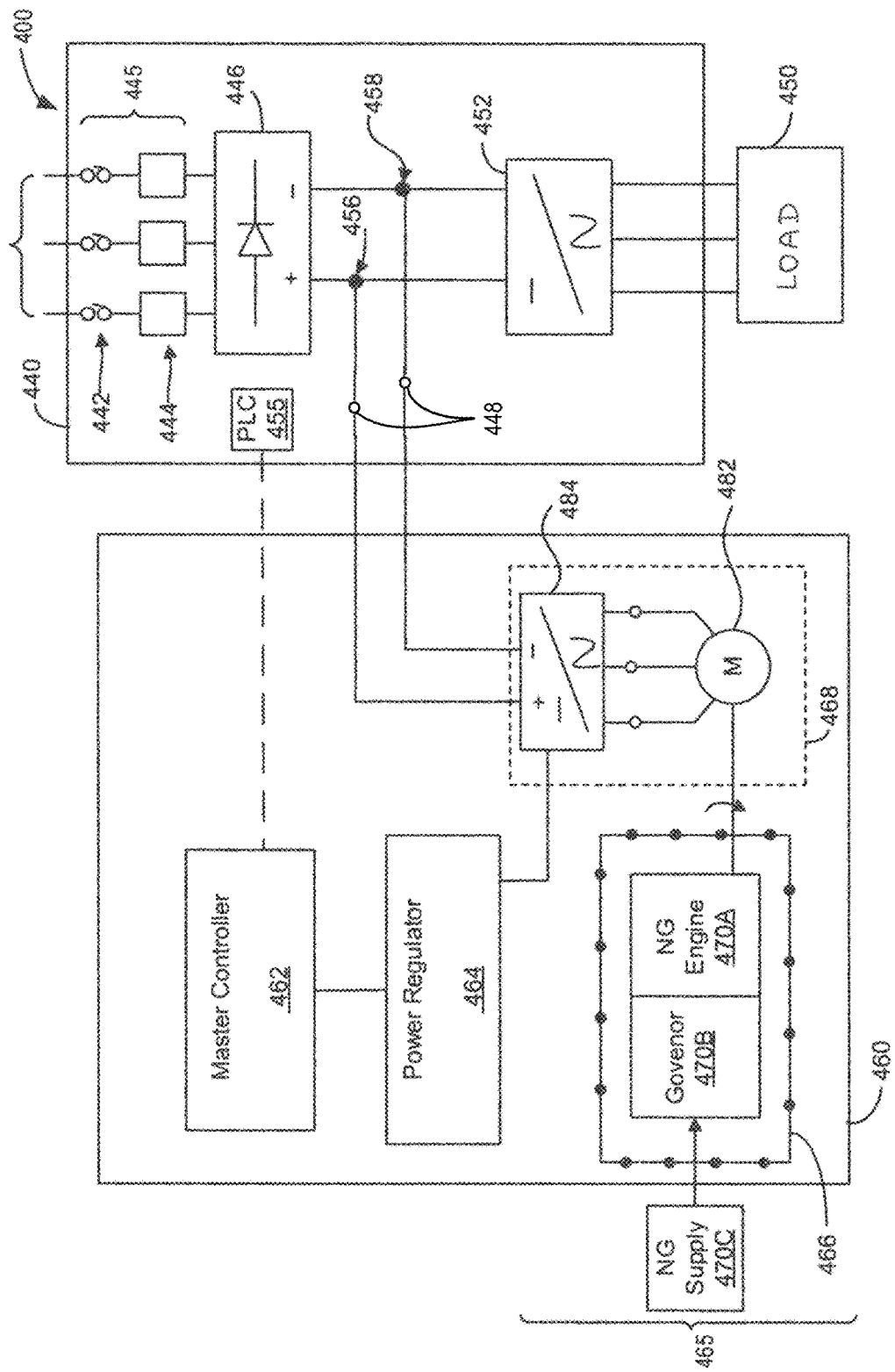
FIG. 4 is an example of a block diagram of a power management platform.

Reference is next made to FIG. 4, which illustrates a power management platform 400 according to an example embodiment. Power management platform 400 is illustrated with reference to the power management system 460 and an electrical panel 440. Power management system 460 of FIG. 4 is analogous to power management system 260 of FIG. 2, and the electrical panel 440 of FIG. 4 is analogous to VFD panel 240 of FIG. 2.

The power management system 460 includes a master controller 462, which is analogous to the master controller 262 of FIG. 2, and a power regulator 464, which is analogous to the power regulator 264 of FIG. 2. The power management system 460 also includes a DC power generation system 465.

The DC power generation system 465 includes a prime mover 466 and a DC power generator 468. Prime mover 466 in this embodiment consists of a natural gas engine 470A, whose speed is controlled by a governor 470B. Natural gas engine 470A may be a natural gas powered reciprocating engine. Prime mover 466 is coupled to a natural gas supply 470C, which is accessible to the facility and the power management system 460.

The natural gas fuel supplied from the natural gas supply 470C is provided to the natural gas engine 470A via the governor 470B. Governor 470B modulates the amount of natural gas that is provided to the engine 470A in order to control the speed of the engine 470A. The drive shaft of the engine 470A is coupled to the DC power generator 468.

In the illustrated embodiment, the DC power generator 468 includes an induction motor 482 and an induction motor inverter 484. The drive shaft of the engine 470A is coupled to the induction motor 482 of the DC power generator 468 to rotate the rotor of the induction motor 482. The operation of the governor 470B is regulated by the power regulator 464, which takes into account the set points of the engine 470A and the induction motor 482.

The three phase electrical power generated by the induction motor 482 is transmitted to the induction motor inverter 484, which converts the AC power to a DC power for delivery to the positive DC power bus 456 and negative DC power bus 458 at connection point 448. The operation of the induction motor inverter 484 is controlled by the power regulator 464, which instructs the inverter 484 to generate a predetermined DC voltage.

In the illustrated embodiment, the power management system 460 in parallel with the electrical panel 440 provides the functionality of a UPS system configured to provide uninterrupted power to run the electrical load or loads 450 within a facility. In such embodiments, the target power amount delivered by the power generation system 465 may be determined based on the total electrical load presented to the electrical panel 440 in cases of power interruption from the power network.

As illustrated, the electrical panel 440 includes a disconnect system 445, analogous to disconnect system 245 of FIG. 2. The disconnect system consists of a first device 442, analogous to the first device 242 of FIG. 2, and a second device 444, analogous to the second device 244 of FIG. 2.

The electrical panel 440 also includes a DC rectifier 446, analogous to DC rectifier 246 of FIG. 2. The DC rectifier 446 is connected to a UPS inverter 452 via a positive DC power bus 456 and a negative DC power bus 458.

As shown, the UPS inverter 452 is coupled to a three phase electrical load 450. The electrical load 450 may be any load such as machines used in a food processing plant, machines used in a steel slitting plant, etc. The UPS inverter is configured to provide a predetermined voltage and frequency to an electrical load 450. The electrical panel 440 also includes a PLC 455, analogous to PLC 255 of FIG. 2.

In on example, the electrical load 450 is assumed to require a maximum of 500 kW of power. The DC power generator 468 is sized to be able to deliver a predetermined target amount of power to the electrical load 450. In some cases, the DC power generator 468 delivers a maximum of 300 kW power to the DC power bus 456, 458, and the utility provides the other 200 KW of power. However, in case of power interruption from the utility or power network, the DC power generator 468 is configured to deliver the full 500 KW of power to the electrical load 450 for uninterrupted operation.

Figure 5:
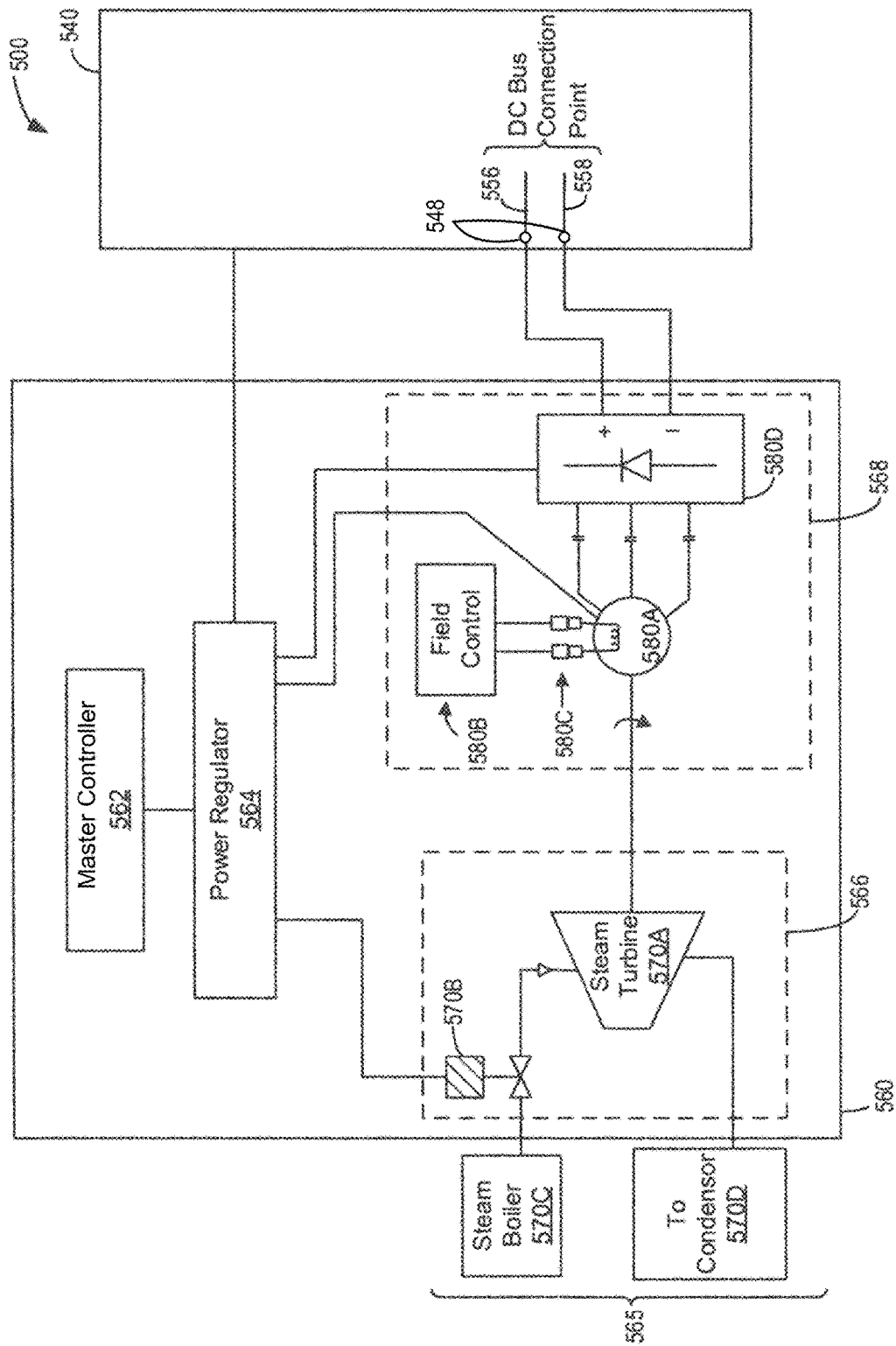
FIG. 5 is another example of a block diagram of a power management platform.

Reference is next made to FIG. 5, which illustrates a power management platform 500 according to an example embodiment. Power management platform 500 is illustrated with reference to the power management system 560 and VFD panel 540. Power management system 560 of FIG. 5 is analogous to power management system 260 of FIG. 2, and the VFD panel 540 of FIG. 5 is analogous to VFD panel 240 of FIG. 2.

The power management system 560 includes a master controller 562, which is analogous to the master controller 262 of FIG. 2, and a power regulator 564, which is analogous to the power regulator 264 of FIG. 2. The power management system 560 also includes a DC power generation system 565.

The DC power generation system 565 includes a prime mover 566 and a DC power generator 568. Prime mover 566 in this embodiment consists of a steam turbine 570A, which is controlled by a steam control valve 570B. In this embodiment, the steam is supplied by a steam boiler 570C, which may be provided by a third party, such as a utility company, or may be a part of the facility itself. For example, if the facility is a strip steel pickling line, the steam boiler 570C is part of the facility itself.

The steam from the steam boiler 570C is provided to the steam control valve 570B, which regulates the supply of steam to the steam turbine 570A based on instructions from the power regulator 564. The steam received by the steam turbine 570A causes the turbine to rotate, thereby rotating the drive shaft that is coupled to the DC power generator 568. In the illustrated embodiment, the prime mover 566 is connected to a condenser 570D, which converts the steam received from the steam turbine 570A to water.

DC power generator 568 includes an alternator 580A and an alternator field controller 580B, which powers the rotor coils of the alternator 580A via slip rings 580C. The operation of the field controller 580B is controlled by the power regulator 564, which provides instructions to the field controller 580B to regulate its magnetic flux density, which determines the voltage and current generated by the alternator 580A in its three phase stator windings. DC power generator 568 also includes a DC rectifier 580D. The alternator 580A is configured to generate a three phase AC voltage, which is rectified by the DC rectifier 580D, which provides DC power to the positive DC power bus 556 and negative DC power bus 558 at connection point 548.

The operation of the steam control valve 570B is based on the control instructions from power regulator 564. Based on the control instructions from the power regulator 564, the steam control valve 570B controls the amount of steam provided to the steam turbine 570A, and accordingly the speed of the drive shaft. The speed of the steam turbine 570A and the drive shaft further controls the speed and torque of the alternator 580A.

In the illustrated embodiment, the VFD panel 540 may be any suitable panel as disclosed herein. For example, the VFD panel 540 may belong to an ice rink refrigeration control system such as in the context of FIG. 1B. In another example, the VFD panel 540 may belong to a steel slitting system, such as in the context of FIG. 2.

In one example, the VFD panel 540 belongs to a strip steel pickling line (push-pull configuration). A typical strip steel pickling line is made up of multiple electrical loads which are controlled in a coordinated manner by a pickling line PLC to transport the strip steel through a hydrochloric acid process section.

In this example, the variable frequency or variable speed motor load or loads of a steel pickling line system are assumed to require a maximum of 900 kW of power. The DC power generator 568 is sized to be able to deliver a predetermined percentage of maximum power required by the electrical loads. For example, the DC power generator 568 is sized to deliver a maximum of 750 kW power to the DC power bus 556, 558. Accordingly, in this example, when the electrical loads are operating under full load conditions, the primary power consumption from the utility is only 150 kW of power. The remaining 750 kW power is generated onsite by the power management system 560, particularly DC power generator 568, and provided to the DC power bus 556, 558.

Figure 6:
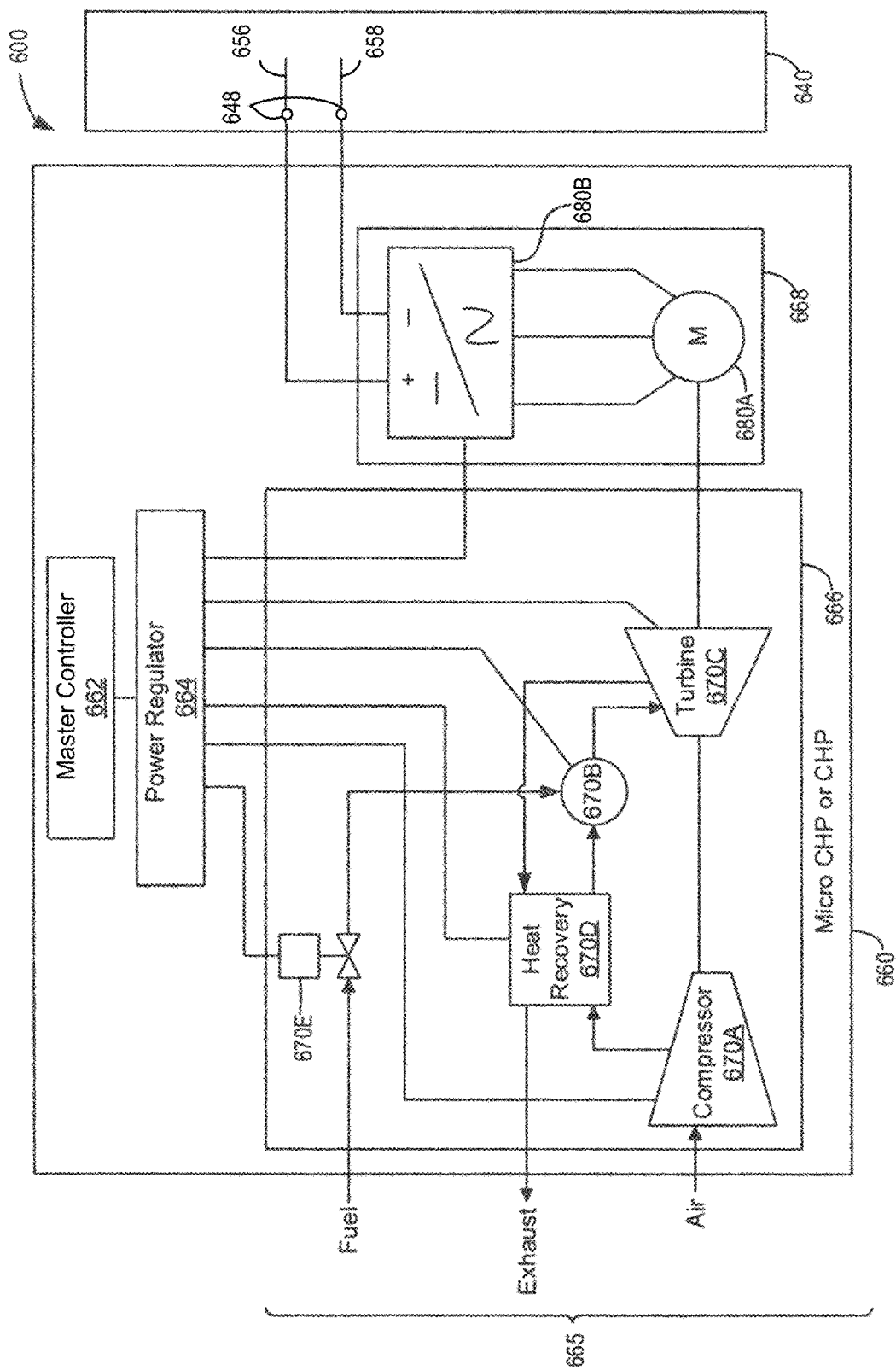
FIG. 6 is a further example of a block diagram of a power management platform.

Reference is next made to FIG. 6, which illustrates a power management platform 600 according to an example embodiment. Power management platform 600 is illustrated with reference to the power management system 660 and VFD panel 640. Power management system 660 of FIG. 6 is analogous to power management system 260 of FIG. 2, and the VFD panel 640 of FIG. 6 is analogous to VFD panel 240 of FIG. 2.

The power management system 660 includes a master controller 662, which is analogous to the master controller 262 of FIG. 2, and a power regulator 664, which is analogous to the power regulator 264 of FIG. 2. The power management system 660 also includes a DC power generation system 665.

DC power generation system 665 includes a prime mover 666 and DC power generator 668. In the illustrated embodiment, prime mover 666 is made up of a combined heat and power plan (CHP) or Micro CHP. Prime mover 666 includes a CHP turbine 670C, which provides mechanical energy to a DC power generator 668. Prime mover 666 also includes a compressor 670A, combustion chamber 670B, turbine 670C, heat recovery unit 670D and fuel valve 670E. A CHP plant based prime mover tends to be efficient as it can provide both heat and electrical energy to a facility. CHP plant can be considered to be a greenhouse technology.

As shown, the fuel valve 670E receives natural gas fuel from a supply line, which may be located remotely from the facility. The fuel valve 670E regulates the amount of natural gas fuel supplied to the combustion chamber 670B. Ambient air is fed to the compressor 670A, which is driven by the power shaft of the turbine 670C. The compressed air from the compressor 670A is heated in the heat recovery unit 670D, and then fed to the combustion chamber 670B. The combustion chamber 670B is configured to receive the heated compressed air from the heat recovery unit 670D and natural gas fuel from the fuel valve 670E, and the resulting hot combustion gas is fed to the inlet of the turbine 670C, which causes the turbine shaft to rotate. The turbine shaft is coupled to the DC power generator 668.

DC power generator 668 includes an induction motor 680A and an induction motor inverter 680B. The induction motor 680A is analogous to the induction motor 482 of FIG. 4, and the induction motor inverter 680B is analogous to the induction motor inverter 484 of FIG. 4. The three phase stator windings of the induction motor 680A are connected to the induction motor inverter 680B, which converts the AC power to DC power for delivery to the positive DC power bus 666 and negative DC power bus 668. The operation of the induction motor inverter 680B is controlled by the power regulator 664, which instructs the inverter 680B to generate a predetermined DC voltage.

In the illustrated embodiment, the operation of the compressor 670A, heat recovery unit 670C, fuel valve 670E, combustion chamber 670B and turbine 670C are regulated by the power regulator 664, to ensure that the various components, as well as the induction motor 680A operate respectively within the performance characteristics, including set points, of these components.

In the illustrated embodiment, the VFD panel 640 may be any suitable panel as disclosed herein. For example, the VFD panel 640 may belong to an ice rink refrigeration control system such as in the context of FIG. 1B. In another example, the VFD panel 640 may belong to a steel slitting system, such as in the context of FIG. 2.

In one example, the VFD panel 640 belongs to an ice rink refrigeration control system. In this example, the variable speed or variable frequency motor load corresponding to the ice rink refrigeration system is assumed to require a maximum of 200 kW of power. The DC power generator 668 is sized to be able to deliver a predetermined percentage of maximum power required by the electrical loads. For example, the DC power generator 668 is sized to deliver a maximum of 80 kW power to the DC power bus 656, 658. Accordingly, in this example, when the electrical load is operating under full load conditions, the primary power consumption from the utility is 160 kW 120 kW of power, and the secondary power consumption from the onsite power management system 660 is 80 kW.

In this example, while the majority of the power is being supplied from the primary power source, the overall power consumption costs incurred by the facility is nevertheless reduced because of the heat output from the power generation system 665. In other words, the proposed example is still beneficial for the facility when both heat and electrical power supply from the power management system 660 are considered.

Figure 7:
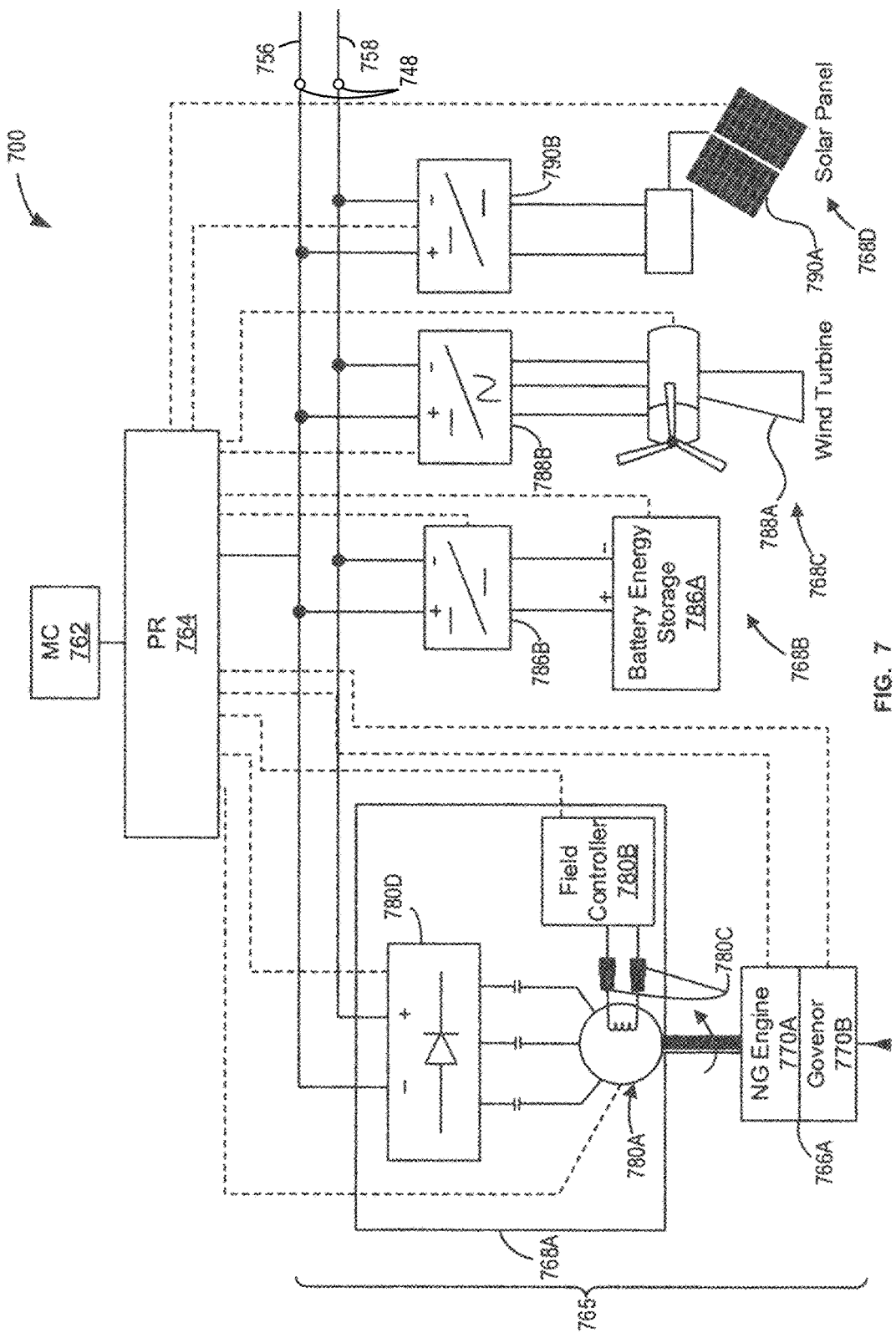
FIG. 7 is another example of a block diagram of a power management platform.

Reference is next made to FIG. 7, which illustrates a power management system 700 according to an example embodiment. Power management system 700 of FIG. 7 is analogous to various power management systems disclosed herein.

The power management system 700 includes a master controller 762, which is analogous to various master controllers disclosed herein, and a power regulator 764, which is analogous to various power regulators disclosed herein. The power management system 700 also includes a DC power generation system 765.

In the illustrated embodiment of FIG. 7, a hybrid DC power generation system 765 is provided. The hybrid DC power generation system 765 consists of multiple onsite power generating resources and associated prime movers (where applicable), which provide DC power to a common bus system 756, 758 at connection point 748.

As illustrated, the hybrid DC power generation system 765 includes a natural gas based onsite generation system, which includes a prime mover 766A and a DC power generator 768A. The hybrid DC power generation system 765 also includes a battery based DC power generator 768B. In addition, the hybrid DC power generation system 765 includes a wind based DC power generator 768C and a solar based DC power generator 768D.

The prime mover 766A of the natural gas based onsite generation system includes a natural gas reciprocating engine 770A and a governor 770B. The prime mover 766A is analogous to prime mover 466 of FIG. 4 in structure and functionality. The natural gas based DC power generator 768A includes an alternator 780A, a field controller 780B, slip rings 780C and a DC rectifier 780D. The natural gas based DC power generator 768A is analogous to DC power generator 568 of FIG. 5 in structure and functionality.

The battery based DC power generator 768B includes battery storage system 786A and a DC/DC converter 786B. No prime mover is required with the battery based DC power generator 768B. The battery based DC power generator 768B is analogous to DC power generator 368 of FIG. 3 in structure and functionality.

Reference is next made to wind based DC power generator 768C, which includes a wind turbine alternator 788A and a wind turbine inverter 788B. In various embodiments disclosed herein, the primary source of power from the utility or power network, and the secondary source of power from the power management system are connected in parallel on a DC power bus, and provide a DC voltage source of power to the electrical loads. In some cases, the power generated by one or more of the energy resources in the power management system includes AC voltage, such as shown in FIG. 7 in the context of wind turbine. In such cases, the AC voltage is converted into DC voltage before connecting in parallel to the primary source of power on the DC power bus. This is also shown in FIG. 7, where the AC power generated by the wind turbine alternator 788A is provided to a wind turbine inverter 788B for conversion from AC to DC voltage.

In particular, the wind turbine alternator 788A is configured to convert the wind energy into electrical energy. The wind turbine alternator 788A generates a three phase AC power, which is converted into DC power by wind turbine inverter 788B. The amount of wind energy generated by the wind based DC power generator 768C is dependent on weather conditions as wind energy is only produced if the wind speed is above a predetermined value.

Reference is next made to solar based DC power generator 768D, which includes one or more solar panels 790A and a DC-DC converter 790B. The solar panels 790A are configured to convert the solar energy into electrical energy. The DC-DC converter 790B is configured to step up, step down and/or filter the DC voltage generated by the solar panel 790A to DC power deliverable to the DC power bus 756, 758. The amount of solar energy generated by the solar based DC power generator 768D is dependent on factors such as time of day and environmental conditions.

In a hybrid DC power generation system 765 such as the one illustrated in FIG. 7, the master controller 762 is configured to coordinate and manage the operations of the various onsite power generation resources based on a variety of factors. For example, to coordinate the operations of the natural gas based resource and battery based resource, the master controller 762 takes into consideration a variety of factors, such as battery charging control, to ensure the batteries are charged with the lowest cost energy source which may be at night when rates are lower; battery discharge control to ensure battery discharging complies with battery specification; battery cell monitoring for lithium batteries to prevent discharge conditions which result in a possible fire hazard; and resource integration management for electrical utility supply, gas generated supply and battery storage supply to minimized operating costs and utility costs, etc.

Similarly, to coordinate the operations of the natural gas based resource and wind based resource, the master controller 762 takes into consideration a variety of factors, such as availability of wind above a predetermined value; management for storing wind energy if no power is required by the VFD Panel; wind power transient management to prepare for situations when wind energy becomes abruptly available or unavailable, etc.

Likewise, to coordinate the operations of the natural gas based resource and solar based resource, the master controller 762 takes into consideration a variety of factors, such as availability of solar energy above a predetermined value; management for storing solar energy if no power is required by the VFD Panel; solar power transient management to prepare for situations when solar energy becomes abruptly available or unavailable, etc.

In various embodiments, where multiple power generating resources are available, the master controller 762 is configured to select the types of resources to be engaged at a given time to generate secondary power for the electrical load. The master controller 762 is also configured to determine the duration and frequency of operation of various resources engaged in the generation of secondary power. In various cases, the master controller 762 may be configured to determine which energy resources to engage and for how long based on certain goals, such as, such as achieving the lowest cost of operation for the facility electrical system, prioritizing the use of renewable sources of power generation, prioritizing the use of certain fuels (e.g. steam, natural gas, etc.) for secondary power generation, etc.

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments. Furthermore, this description is not to be considered as limiting the scope of these embodiments in any way, but rather as merely describing the implementation of these various embodiments.

I claim:

1. A power management system for providing power supply to an electrical load within a facility, the facility being connected to a power network, the power network being a grid network or an islanded network, the power management system comprising:
a controller coupled to an electrical panel, the electrical panel configured to control the operation of the electrical load, the controller being configured to determine a target power amount to be provided to the electrical load based on peak power amount required by the electrical load;
a power regulator coupled to the controller, the power regulator being configured to receive a target power control signal corresponding to the target power amount from the controller; and
a power generation system coupled to the power regulator, the power generation system being configured to receive at least one control signal corresponding to operation of the power generation system from the power regulator, the power generation system being configured to generate target electrical power corresponding to the target power amount based on the at least one control signal,
the power generation system further being configured to transmit the target electrical power to the electrical panel via a direct current (DC) voltage power bus.

2. The power management system of claim 1, wherein the target power amount is additionally determined based on power required by the electrical load during power interruption to the electrical panel from the power network.

3. The power management system of claim 1, wherein the electrical load is a variable speed load coupled to a variable frequency drive inverter.

4. The power management system of claim 1, wherein the electrical load is a device coupled to an uninterruptable power supply inverter.

5. The power management system of claim 1, wherein the target electrical power is provided to the DC voltage power bus at a connection point, the target electrical power being connected in parallel to primary power received by the electrical panel at the connection point.

6. The power management system of claim 1, wherein the power generation system comprises a prime mover coupled to a power generator, wherein the prime mover is configured to generate a target mechanical energy based on the at least one control signal, and the power generator is configured to convert the target mechanical energy to the target electrical power based on the at least one control signal.

7. The power management system of claim 1, wherein the power generation system comprises a power generator configured to convert a renewable energy to the target electrical power based on the at least one control signal.

8. The power management system of claim 1, wherein the power generation system comprises a power generator configured to convert a stored electrical energy to the target electrical power based on the at least one control signal.

9. The power management system of claim 1, wherein the target electrical power is converted to a corresponding three phase AC power by a variable frequency drive inverter located within the electrical panel, the corresponding three phase AC power being provided to the electrical load.

10. The power management system of claim 1, wherein the target electrical power is converted to a corresponding three phase AC power by an uninterruptable power supply inverter located within the electrical panel, the corresponding three phase AC power being provided to the electrical load.

11. A method of operating a power management system for providing power supply to an electrical load within a facility, the facility being connected to a power network, the power network being a grid network or an islanded network, the method comprising:
determining, by a controller, a target power amount to be provided to the electrical load based on peak power amount required by the electrical load;
determining, by a power regulator, at least one control signal corresponding to operation of a power generation system based at least on the target power amount;
generating, by the power generation system, target electrical power corresponding to the target power amount based on the at least one control signal; and
transmitting the target electrical power to an electrical panel configured to control the operation of the electrical load via a direct current (DC) voltage power bus, the target electrical power being provided in parallel to primary power received by the electrical panel from the power network.

12. The method of claim 11, further comprising:
converting a combined electrical power to a corresponding three phase AC electrical power, the combined electrical power being a combination of target electrical power and primary power; and
operating the electrical load based on the corresponding three phase AC electrical power.

13. The method of claim 11, further comprising:
determining the target power amount based on the power required by the electrical load during power interruption to the electrical panel from the power network.

14. The method of claim 11, wherein the electrical load is a variable speed load coupled to a variable frequency drive inverter.

15. The method of claim 11, wherein the electrical load is a device coupled to an uninterruptable power supply inverter.

16. The method of claim 11, wherein the target electrical power is provided to the DC voltage power bus at a connection point, the target electrical power being connected in parallel to the primary power received by the electrical panel at the connection point.

17. The method of claim 11, wherein the power generation system comprises a prime mover coupled to a power generator, wherein the prime mover is configured to generate a target mechanical energy based on the at least one control signal, and the power generator is configured to convert the target mechanical energy to the target electrical power based on the at least one control signal.

18. The method of claim 11, wherein the power generation system comprises a power generator configured to convert a renewable energy to the target electrical power based on the at least one control signal.

19. The method of claim 11, wherein the power generation system comprises a power generator configured to convert a stored electrical energy to the target electrical power based on the at least one control signal.

20. The method of claim 11, wherein the target electrical power is converted to a corresponding three phase AC power by a variable frequency drive inverter or an uninterruptable power supply inverter located within the electrical panel.

* * * * *